(12) United States Patent
Giraud

(10) Patent No.: US 10,955,632 B2
(45) Date of Patent: Mar. 23, 2021

(54) FIBER OPTIC CONNECTOR PARKING DEVICE

(71) Applicant: CORNING RESEARCH & DEVELOPMENT CORPORATION, Corning, NY (US)

(72) Inventor: William Julius McPhil Giraud, Azle, TX (US)

(73) Assignee: Corning Research & Development Corporation, Corning, NY (US)

( * ) Notice: Subject to any disclaimer, the term of this patent is extended or adjusted under 35 U.S.C. 154(b) by 0 days.

(21) Appl. No.: 16/658,309

(22) Filed: Oct. 21, 2019

(65) Prior Publication Data

US 2020/0150371 A1 May 14, 2020

Related U.S. Application Data

(60) Provisional application No. 62/760,496, filed on Nov. 13, 2018.

(51) Int. Cl.
*G02B 6/44* (2006.01)
*G02B 6/38* (2006.01)

(52) U.S. Cl.
CPC .......... *G02B 6/4452* (2013.01); *G02B 6/3825* (2013.01)

(58) Field of Classification Search
CPC .................. G02B 6/4452; G02B 6/3825
USPC ..................................................... 385/135
See application file for complete search history.

(56) References Cited

U.S. PATENT DOCUMENTS

| 7,218,827 | B2 | 5/2007 | Vongseng et al. |
| 7,734,138 | B2 | 6/2010 | Bloodworth et al. |
| 7,867,022 | B2 * | 1/2011 | Davison ............... G02B 6/4292 439/540.1 |
| 8,472,773 | B2 | 6/2013 | de Jong |
| 2004/0179787 | A1 * | 9/2004 | Glazowski ........... G02B 6/3878 385/76 |
| 2007/0175654 | A1 * | 8/2007 | Keith ..................... H05K 7/186 174/135 |
| 2012/0033926 | A1 * | 2/2012 | de Jong ............... G02B 6/3879 385/135 |
| 2014/0003772 | A1 | 1/2014 | Burkett et al. |
| 2015/0270637 | A1 | 9/2015 | Islam et al. |
| 2018/0246289 | A1 | 8/2018 | Amaya Cruz et al. |

FOREIGN PATENT DOCUMENTS

WO 2017064278 A1 4/2017

OTHER PUBLICATIONS

International Search Report and Written Opinion of the International Searching Authority; PCT/US2019/057588; dated Dec. 18, 2019; 12 pages; European Patent Office.

* cited by examiner

*Primary Examiner* — Jerry M Blevins
(74) *Attorney, Agent, or Firm* — Grant A. Gildehaus

(57) ABSTRACT

A fiber optic parking device includes a support wall having front and rear sides, and also includes at least one mount extending outwardly from the rear side of the support wall and defining a first plane. The fiber optic parking device further includes a platform extending outwardly from the front side of the support wall and defining a second plane, the platform including a plurality of connector slips. Each of the connector slips extends along a corresponding axis parallel to the second plane and intersecting the first plane at an acute angle.

23 Claims, 4 Drawing Sheets

FIBER OPTIC CONNECTOR PARKING DEVICE

PRIORITY APPLICATION

This application claims the benefit of priority of U.S. Provisional Application No. 62/760,496, filed on Nov. 13, 2018, the content of which is relied upon and incorporated herein by reference in its entirety.

TECHNICAL FIELD

This disclosure relates generally to optical connectivity, and more particularly to a fiber optic connector parking device for storing and organizing fiber optic connectors and their associated fiber optic cables in a terminal for future use.

BACKGROUND

Optical fibers are useful in a wide variety of applications, including the telecommunications industry for voice, video, and data transmissions. The benefits of optical fiber are well known and include higher signal-to-noise ratios and increased bandwidth compared to conventional copper-based transmission technologies. To meet modern demands for increased bandwidth and improved performance, telecommunication networks are increasingly providing optical fiber connectivity closer to end subscribers. These initiatives include fiber-to-the-node (FTTN), fiber-to-the-premises (FTTP), fiber-to-the-home (FTTH), and the like (generally described as FTTx).

In an FTTx network, fiber optic cables are used to carry optical signals to various distribution points and, in some cases, all the way to end subscribers. For example, FIG. 1 is a schematic diagram of an exemplary FTTx network 10 that distributes optical signals generated at a switching point 12 (e.g., a central office of a network provider) to subscriber premises 14. Optical line terminals (OLTs; not shown) at the switching point 12 convert electrical signals to optical signals. Fiber optic feeder cables 16 then carry the optical signals to various local convergence points 18, which act as locations for splicing and making cross-connections and interconnections. The local convergence points 18 often include splitters to enable any given optical fiber in the fiber optic feeder cable 16 to serve multiple subscriber premises 14. As a result, the optical signals are "branched out" from the optical fibers of the fiber optic feeder cables 16 to optical fibers of distribution cables 20 that exit the local convergence points 18.

At network access points closer to the subscriber premises 14, some or all of the optical fibers in the distribution cables 20 may be accessed to connect to one or more subscriber premises 14. Drop cables 22 extend from the network access points to the subscriber premises 14, which may be single-dwelling units (SDU), multi-dwelling units (MDU), businesses, and/or other facilities or buildings. A conversion of optical signals back to electrical signals may occur at the network access points or at the subscriber premises 14.

There are many different network architectures, and the various tasks required to distribute optical signals (e.g., splitting, splicing, routing, connecting subscribers) can occur at several locations. Regardless of whether a location is considered a local convergence point, network access point, subscriber premise, or something else, fiber optic equipment is used to house components that carry out one or more of the tasks. The term "terminal" will be used in this disclosure to generically refer to such equipment, which may include fiber distribution hubs (FDH), cabinets, closures, network interface devices, etc.

Some terminals may include fiber optic connectors that are reserved for future connections. Depending on the location where the terminal is used in the network, there may be anywhere from one to hundreds of such connectors. Storage or "parking" features are typically included in the terminal to store connectors that are reserved for future use. Accommodating such features can be challenging when designing a terminal, particularly when a fairly large quantity, such as dozens or hundreds, of unused connectors are involved. The space within a terminal is typically limited because there is also a need to properly route and store cables, to accommodate components for splicing, splitting, or the like, and to allow technicians to effectively install or operate the components. Making terminals larger may not necessarily help with organization and may increase the likelihood of customers considering the equipment to be obtrusive.

SUMMARY

In one embodiment, a fiber optic parking device includes a support wall having front and rear sides, and also includes at least one mount extending outwardly from the rear side of the support wall and defining a first plane. The fiber optic parking device further includes a platform extending outwardly from the front side of the support wall and defining a second plane, the platform including a plurality of connector slips. Each of the connector slips extends along a corresponding axis parallel to the second plane and intersecting the first plane at an acute angle. In one embodiment, the fiber optic parking device includes a plurality of partitions spaced apart from each other to at least partially define the plurality of connector slips. Each of the partitions may extend in a direction parallel to the axes. In addition or alternatively, each of the partitions may extend outwardly from the front side of the support wall.

The fiber optic parking device may include a plurality of spring arms spaced apart from each other to at least partially define the plurality of connector slips. In one embodiment, each of the spring arms is positioned at a distal end of the platform. In addition or alternatively, at least one of the spring arms may include a tab having a shoulder facing a corresponding one of the connector slips.

The fiber optic parking device may include a plurality of bores provided in the support wall along each of the axes. In one embodiment, each of the plurality of bores extends through the support wall.

The platform may include a first surface and a second surface, and a first portion of the plurality of connector slips may be positioned on the first surface and a second portion of the plurality of connector slips may be positioned on the second surface. In addition or alternatively, the at least one mount may include at least one spring clip having a pair of prongs that extend outwardly from the rear side of the support wall and that are configured to engage with a corresponding aperture of a terminal for mounting the support wall to the terminal. In one embodiment, each of the prongs includes a locking groove configured to engage with a periphery of the corresponding aperture, and the locking grooves define the first plane.

The first and second planes may be substantially perpendicular to each other. In addition or alternatively, the acute angle may be between 20° and 50°. In one embodiment, the at least one mount and the platform are integrally formed together as a unitary (i.e. monolithic) piece.

In another embodiment, a fiber optic assembly includes at least one mounting structure, and at least one fiber optic parking device mounted to the at least one mounting structure. The at least one fiber optic parking device includes a support wall having front and rear sides, and also includes at least one mount extending outwardly from the rear side of the support wall and defining a first plane. The at least one fiber optic parking device further includes a platform extending outwardly from the front side of the support wall and defining a second plane, the platform including a plurality of connector slips. Each of the connector slips extends along a corresponding axis parallel to the second plane and intersecting the first plane at an acute angle. The fiber optic assembly also includes at least one fiber optic connector positioned in one of the connector slips.

The at least one fiber optic parking device may include a plurality of partitions spaced apart from each other to at least partially define the plurality of connector slips, and the at least one fiber optic connector may include a connector body received by a pair of adjacent partitions in the plurality of partitions. In addition or alternatively, the at least one fiber optic parking device may include a plurality of spring arms spaced apart from each other to at least partially define the plurality of connector slips, at least one of the spring arms may include a tab having a shoulder facing the one of the connector slips in which the at least one fiber optic connector is positioned, and the at least one fiber optic connector may include a connector boot engaged by the tab. In another embodiment, the at least one fiber optic parking device may include a plurality of spring arms spaced apart from each other to at least partially define the plurality of connector slips, and the at least one fiber optic connector may include a connector boot received by a pair of adjacent spring arms in the plurality of spring arms.

The at least one fiber optic parking device may include a plurality of bores provided in the support wall along each of the axes, and the at least one fiber optic connector may include a dust cap received in one of the bores. In addition or alternatively, the fiber optic assembly may include a door panel, wherein the at least one mounting structure is provided on the door panel.

The at least one mounting structure may be substantially parallel to the first plane. In addition or alternatively, the first and second planes may be substantially perpendicular to each other. In one embodiment, the acute angle is between 20° and 50°.

Additional features and advantages will be set forth in the detailed description which follows, and in part will be readily apparent to those skilled in the technical field of optical connectivity. It is to be understood that the foregoing general description, the following detailed description, and the accompanying drawings are merely exemplary and intended to provide an overview or framework to understand the nature and character of the claims.

BRIEF DESCRIPTION OF THE DRAWINGS

The accompanying drawings are included to provide a further understanding and are incorporated in and constitute a part of this specification. The drawings illustrate one or more embodiment(s), and together with the description serve to explain principles and operation of the various embodiments. Features and attributes associated with any of the embodiments shown or described may be applied to other embodiments shown, described, or appreciated based on this disclosure.

DETAILED DESCRIPTION

Various embodiments will be further clarified by examples in the description below. In general, the description relates to components that may be used in fiber optic networks to serve as storage locations (i.e., "parking features") for optical fiber connectors that are reserved for future connections.

The components may be used in FTTx networks, such as the FTTx network 10 (FIG. 1) in terminals at local convergence points 18 or network access points, or even in enterprise networks, such as in data center environments. Thus, although the components may be described in connection with an exemplary terminal below, this is merely to facilitate discussion. The components may in fact be used in a wide variety of different equipment for all different types of fiber optic networks.

Figure 1:
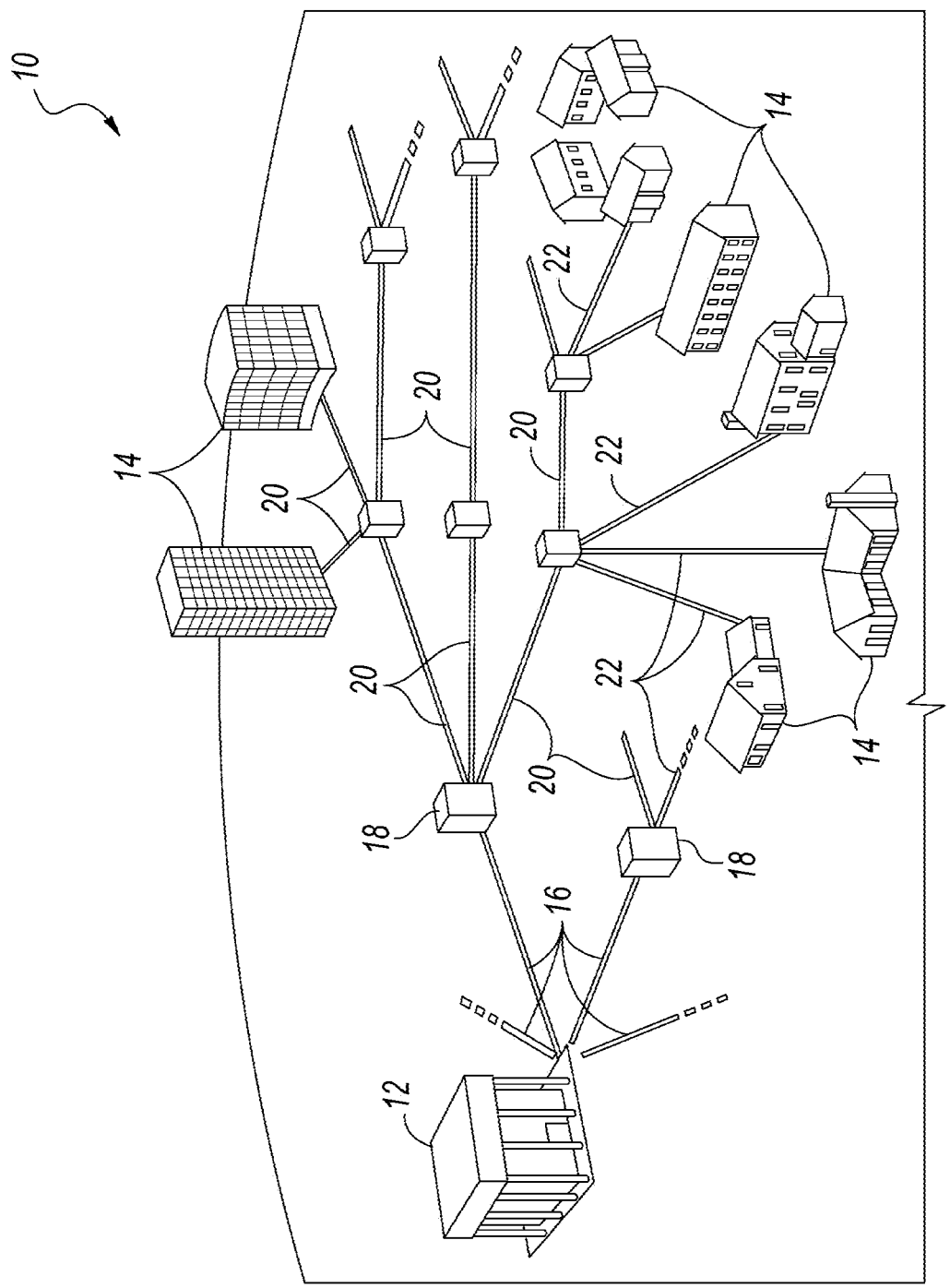
FIG. 1 is a schematic diagram of an example FTTx network.
Figure 2:
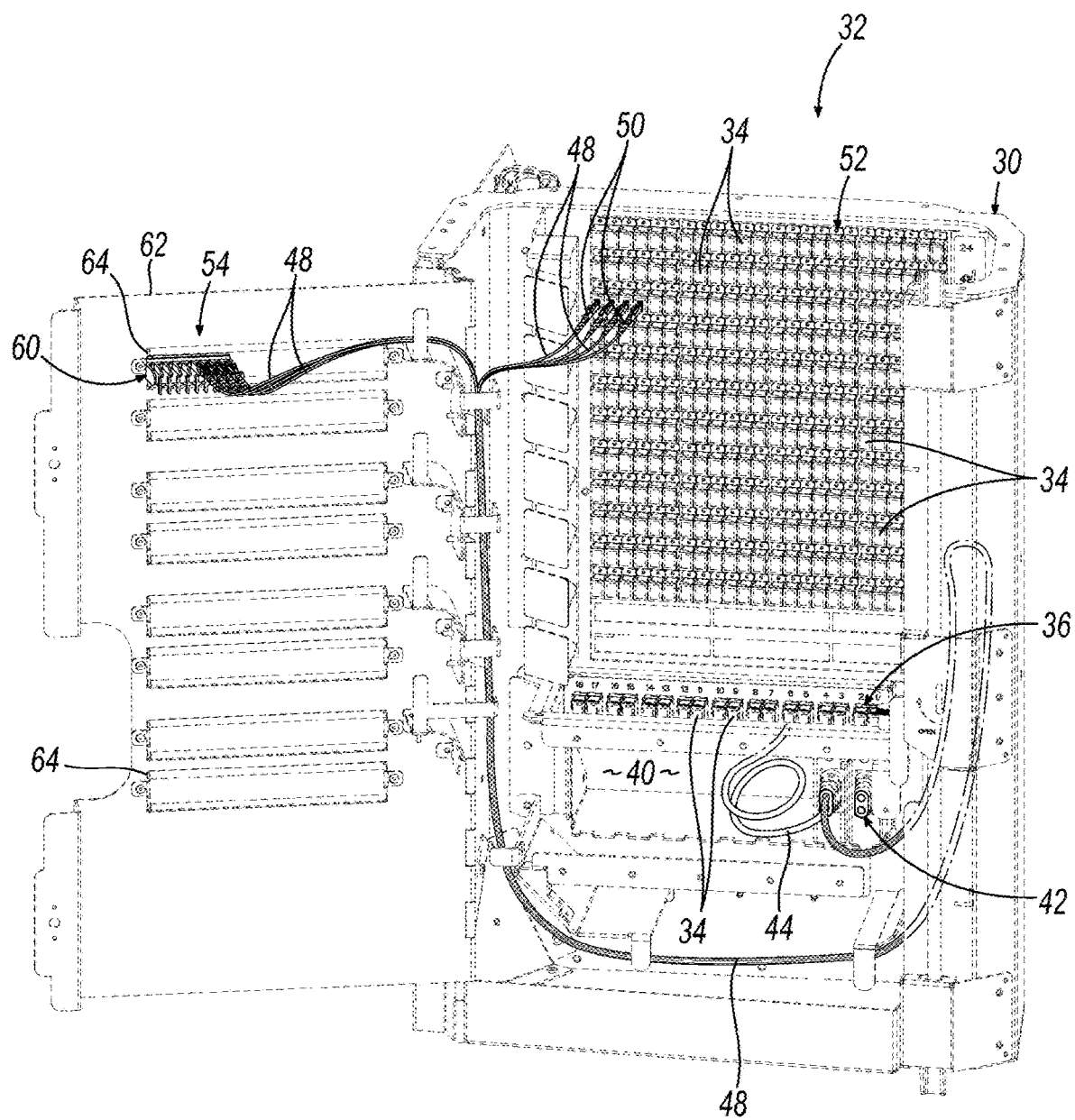
FIG. 2 is a perspective view of one embodiment of a frame for a terminal.

With this in mind, FIG. 2 illustrates one example of frame 30 for a terminal 32 to be placed at one of the local convergence points 18 in FIG. 1. The terminal 32 may be in the form of a cabinet or enclosure that includes the frame 30 installed in a housing (not shown). The frame 30 supports various components for accomplishing the network tasks associated with the local convergence point 18. For example, a row of fiber optic adapters 34 supported by the frame 30 defines a feeder field 36 to receive connections associated with one of the feeder cables 16 of the network 10. Optical fibers (not shown) from the feeder cable 16 may be terminated with fiber optic connectors (directly or by splicing to pigtails) that are plugged into the fiber optic adapters 34 on the back side of the frame 30.

Below the feeder field 36, the frame 30 defines a region 40 for receiving and supporting splitter modules 42 (e.g., in slots provided in the frame 30). Only two splitter modules 42 are shown in FIG. 2, and only the splitter module 42 on the left is schematically illustrated with an input cable 44 and a plurality of output cables 48 to simplify the drawings. The input cable 44 carries an input fiber (not shown), and the output cables 48 carry respective output fibers (not shown). The splitter modules 42 each include an optical splitter (not shown) so that a multiplexed signal carried by the input fiber of the input cable 44 can be separated into demultiplexed signals carried by the output fibers of the output cables 48. The multiplexed signal typically comes from the feeder cable 16 (FIG. 1). To this end, the input cable 44 of the splitter module 42 may be terminated with a fiber optic connector (not shown in FIG. 2) and plugged into the front side of the fiber optic adapters 34 in the feeder field 36, thereby establishing optical connections with optical fibers of the feeder cable 16.

The number of output fibers (and corresponding output cables 48) of each splitter module 42 depends on the split ratio (e.g., 1 input fiber and 8 output fibers for a 1×8 splitter, 1 input fiber and 16 output fibers fora 1×16 splitter, 1 input fiber and 32 output fibers for a 1×32 splitter, etc.). Output cables 48 that are "live" (i.e., used in the network to carry signals to and from subscribers) are plugged into the front side of fiber optic adapters 34 in a distribution field 52. There are typically several or many rows of adapters 34 defining the distribution field 52. These adapters 34 are used to establish optical connections with optical fibers of one or more distribution cables 20 that exit the terminal and carry signals further into the network 10 so that ultimately the signals can reach subscribers.

Conventionally, the output cables 48 that are not used for live network traffic, and instead are reserved for future subscribers, are routed to a storage location 54 (also referred to as parking field 54). FIG. 2 illustrates four output cables 48 terminated with respective fiber optic connectors 50 ("connectors 50") that are held within a parking device 60. The parking device 60 is mounted to a door panel 62 of the frame 30 via a mounting structure 64. As can be appreciated, the parking device 60 confronts other components within the frame 30, such as the adapters 34 in the feeder field 36 and/or distribution field 52, when the door panel 62 is in a closed position. Due to the compact nature of the frame 30, the parking device 60 and any connectors 50 held therein may be in very close proximity to such adapters 34 and any connectors 50 held therein. The input and output cables 44, 48 associated with these connectors 50 may interfere with each other if they are not properly organized and routed through the frame 30. For example, if the optical output cables 48 are permitted to initially project away from the parking device 60 in a direction perpendicular to the plane of the door panel 62 (or of the feeder field 36 and/or distribution field 52), then the output cables 48 (and the output fibers carried in the output cables 48) may be required to bend at a sharp angle such as at or near 90° in order to be routed laterally. Avoiding such a bend, or at least avoiding a bend that exceeds a nominal minimum bend radius of the output fibers carried by the output cables 48, may require initial portions of the output cables 48 (e.g., proximate the respective connectors 50) to project farther from the parking device 60 and undesirably closer toward the adapters 34 as the output cables 48 transition to a lateral direction. In one embodiment of the invention, the parking device 60 is configured to facilitate an orientation of the output cables 48 as they exit the parking device 60 that is more conducive to routing the output cables 48 laterally, such as toward a hinged edge of the door panel 62, in order to reduce the space necessary to meet minimum bend radius requirements.

Figure 3:
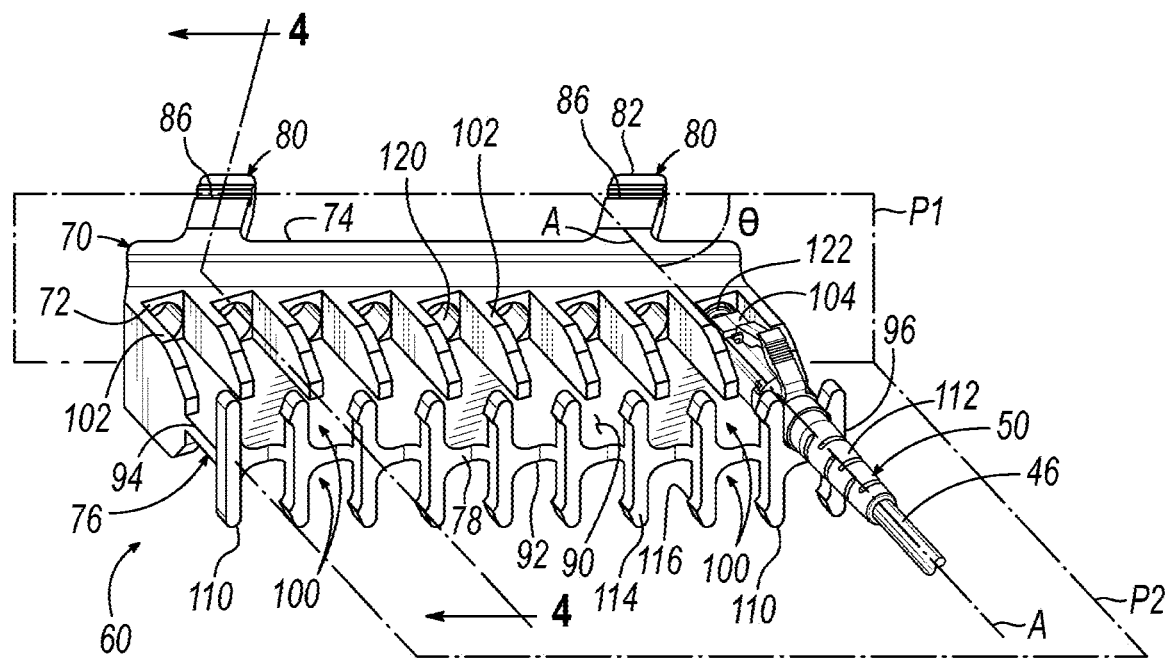
FIG. 3 is a perspective view of an exemplary parking device according to this disclosure.
Figure 4:
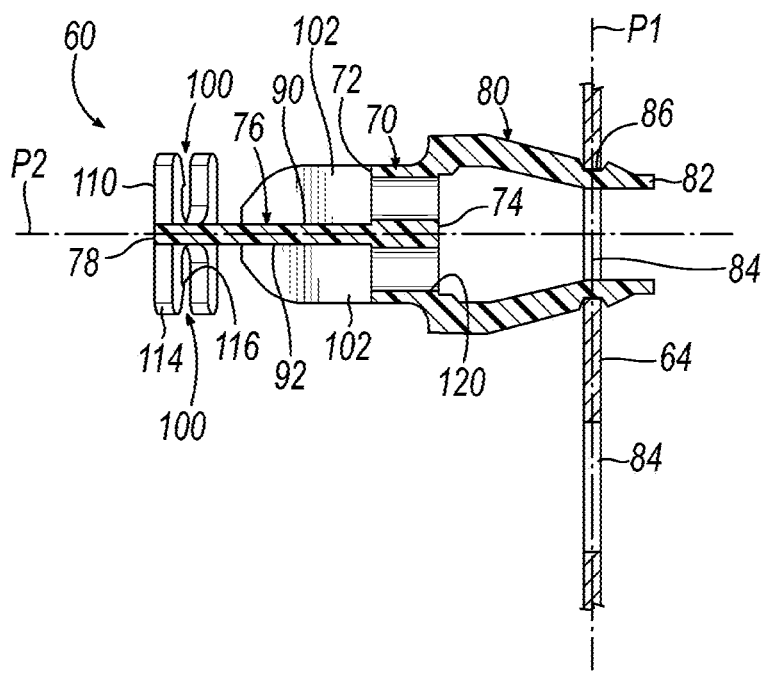
FIG. 4 is a cross sectional view of the parking device taken along section line 4-4 in FIG. 3, showing the parking device mounted to a mounting structure of the frame of FIG. 2.

Referring now to FIGS. 3 and 4, the illustrated parking device 60 includes a support wall 70 having first and second sides 72, 74, a platform 76 extending outwardly from the first side 72 of the support wall 70 to a distal end 78, and two mounts in the form of spring clips 80 for mounting the parking device 60 at a desired location on or within the frame 30. In the embodiment shown, the support wall 70, the platform 76, and the spring clips 80 are integrally formed together as a unitary (i.e., monolithic) piece.

Each spring clip 80 includes a pair of prongs 82 extending outwardly from the second side 74 of the support wall 70 and each pair of prongs 82 is configured to engage with a corresponding aperture 84 of the terminal 32, such as in the mounting structure 64 of the parking field 54, for mounting the parking device 60 to the terminal 32. To this end, each of the illustrated prongs 82 includes a locking groove 86 configured to engage with the periphery of the aperture 84 to assist in securing the parking device 60 in place. In this manner, the locking grooves 86 may dictate or otherwise impact an orientation of the parking device 60 relative to the mounting structure 64 when the parking device 60 is installed on the mounting structure 64. Thus, the locking grooves 86 may together define a mounting plane of the parking device 60, referred to herein as the first plane P1. In the embodiment shown, the locking grooves 86 are generally aligned with each other such that the first plane P1 may be generally vertical in the illustrated orientation of the parking device 60.

As shown, the platform 76 includes a first surface 90 and a second surface 92 extending between first and second sides 94, 96 and defines a second plane P2 generally perpendicular to the first plane P1. A plurality of connector slips 100 ("slips 100") are positioned on each of the first and second surfaces 90, 92 of the platform 76. Alternatively, the slips 100 may be positioned on only one of the surfaces 90, 92. In any event, each of the slips 100 extends along a corresponding axis A. The axes A of the slips 100 are generally parallel to the second plane P2 and intersect the first plane P1 at a generally acute angle θ as described in greater detail below. The first and second sides 94, 96 may also be oriented relative to the first plane P1 at the same generally acute angle θ.

The exemplary parking device 60 includes a plurality of partitions 102 spaced apart from each other between the first and second sides 94, 96 of the platform 76 to at least partially define the plurality of slips 100. The illustrated partitions 102 each extend outwardly from the first side 72 of the support wall 70 in a direction generally parallel to the axes A. In the embodiment shown, the partitions 102 are provided on both the first and second surfaces 90, 92 of the platform 76. Adjacent partitions 102 are configured to together receive a connector body 104 of a connector 50 positioned within the corresponding slip 100. While the partitions 102 are shown as each having a height generally similar to a cross dimension of the corresponding connector 50, it will be appreciated that the partitions 102 may be shorter or taller as may be desired. Likewise, while the partitions 102 are shown as extending partially across the platform 76, such as approximately halfway across the platform 76, it will be appreciated that the partitions 102 may extend greater or less distances across the platform 76, such as substantially entirely across the platform 76.

As shown, a plurality of spring arms 110 are positioned at the distal end 78 of the platform 76 and spaced apart from each other between the first and second sides 94, 96 of the platform 76 to at least partially define the plurality of slips 100. In this regard, each spring arm 110 may be generally aligned with a corresponding partition 102 (e.g., relative to the axes A). Each spring arm 110 extends generally perpendicularly from the corresponding first or second surface 90, 92 of the platform 76. In the embodiment shown, the spring arms 110 are provided on both the first and second surfaces 90, 92 of the platform 76. Adjacent spring arms 110 are configured to together receive a connector boot 112 of a connector 50 positioned within the corresponding slip 100. In this regard, some or all of the spring arms 110 include a tab 114 having a shoulder 116 facing the corresponding slip 100. The shoulders 116 are each configured to engage with the connector boot 112 of the connector 50 positioned within the corresponding slip 100 to assist in retaining the connector 50 in the slip 100.

In the embodiment shown, a plurality of bores 120 are provided in the support wall 70 along each of the axes A.

Each of the bores 120 is sized and/or shaped to receive a dust cap 122 of a connector 50 positioned within the corresponding slip 100. In this manner, the connector 50 may be supported in the slip 100 primarily or entirely by the dust cap 122 being received by the corresponding bore 120 and/or by the connector boot 112 received by the corresponding spring arms 110. In one embodiment, the connector body 104 may be generally suspended in the slip 100. For example, the connector body 104 may not be in direct contact with the corresponding first or second surface 90, 92 of the platform 76. While the bores 120 are shown extending completely through the support wall 70 and may therefore be referred to as through-bores, it will be appreciated that the bores 120 may alternatively extend only partially through the support wall 70 to instead provide blind bores.

While the first plane P1 has been described as being defined by the locking grooves 86 of the spring clips 80, the first plane P1 may alternatively be defined by any other suitable component of the parking device 60. For example, the spring clips 80 may be replaced with any other suitable mounts that may effectively define the mounting plane or first plane P1 when the parking device 60 is installed in a desired location, such as on the terminal 32. For example, one or more brackets (not shown) may be used in place of the spring clips 80 and may define the first plane P1. In addition or alternatively, the support wall 70 may define a plane parallel to the first plane P1, or may itself define the first plane P1.

As mentioned above, each of the axes A are oriented relative to the first plane P1 by the acute angle θ. The acute angle θ may be, for example, between 20° and 50°. In one embodiment, the acute angle θ is approximately 30°. In another embodiment, the acute angle θ is approximately 40°.

The angling of the axes A relative to the first plane P1 may facilitate similar angling of each connector 50 relative to the first plane P1 when the connectors 50 are positioned in the slips 100. Thus, the angling of the axes A relative to the first plane P1 may be used to control the orientation of the connectors 50 relative to the frame 30. For example, the first plane P1 may be selected such that it is generally parallel to the plane (e.g., a surface) of the mounting structure 64 when installed. In such cases, the angling of the axes A relative to the first plane P1 may result in the connectors 50 being angled relative to the plane of the mounting structure 64 at generally the same acute angle θ. In one embodiment, the first plane P1 may be selected such that it is generally parallel to a plane of the door panel 62 and/or feeder or distribution fields 36, 52 when installed, such that the connectors 50 may be angled relative to the door panel 62 and/or feeder or distribution fields 36, 52 at generally the same acute angle θ.

When installed, the second plane P2 may extend in a generally lateral direction (e.g., horizontal), such that each slip 100 is configured to direct a corresponding connector 50 at least slightly laterally as a result of the acute angle θ. In other words, rather than projecting directly away from the slips 100 (e.g., perpendicularly), each connector 50 at least initially projects away from the corresponding slip 100 at the angle θ relative to the first plane P1 and thus at the same angle θ relative to the desired reference plane (e.g., mounting structure 64, door panel 62, distribution field 52, feeder field 36, etc.). This may appreciably reduce the frontal projection of the output cables 48 exiting the parking device 60 since a reduced bend is required for the output fibers to transition to a lateral direction toward their respective destinations (e.g., via the hinged edge of the door panel 62). By virtue of the parking device 60 including slips 100 on both the first and second surfaces 90, 92 of the platform 76, the slips 100 may direct the connectors 50 in either a generally rightward or generally leftward direction depending on whether the parking device 60 is installed with the first surface 90 facing upward or downward, for example.

Figure 6:
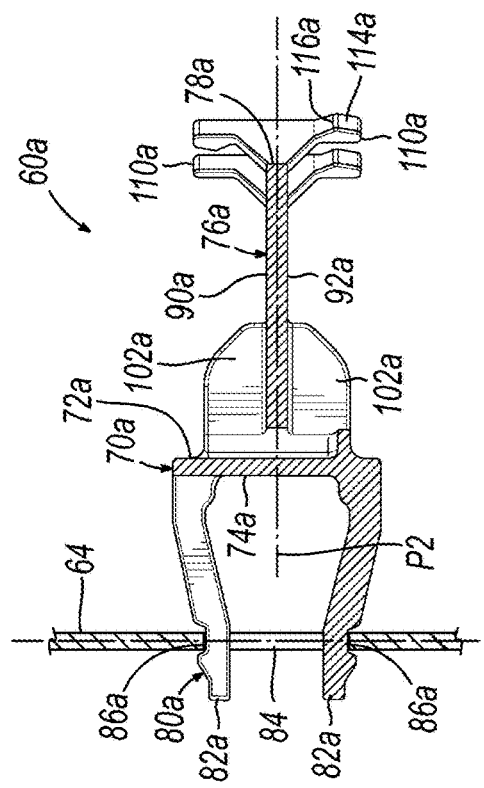
FIG. 6 is a cross sectional view of the parking device taken along section line 6-6 in FIG. 5, showing the parking device mounted to a mounting structure of the frame of FIG. 2.
Figure 5:
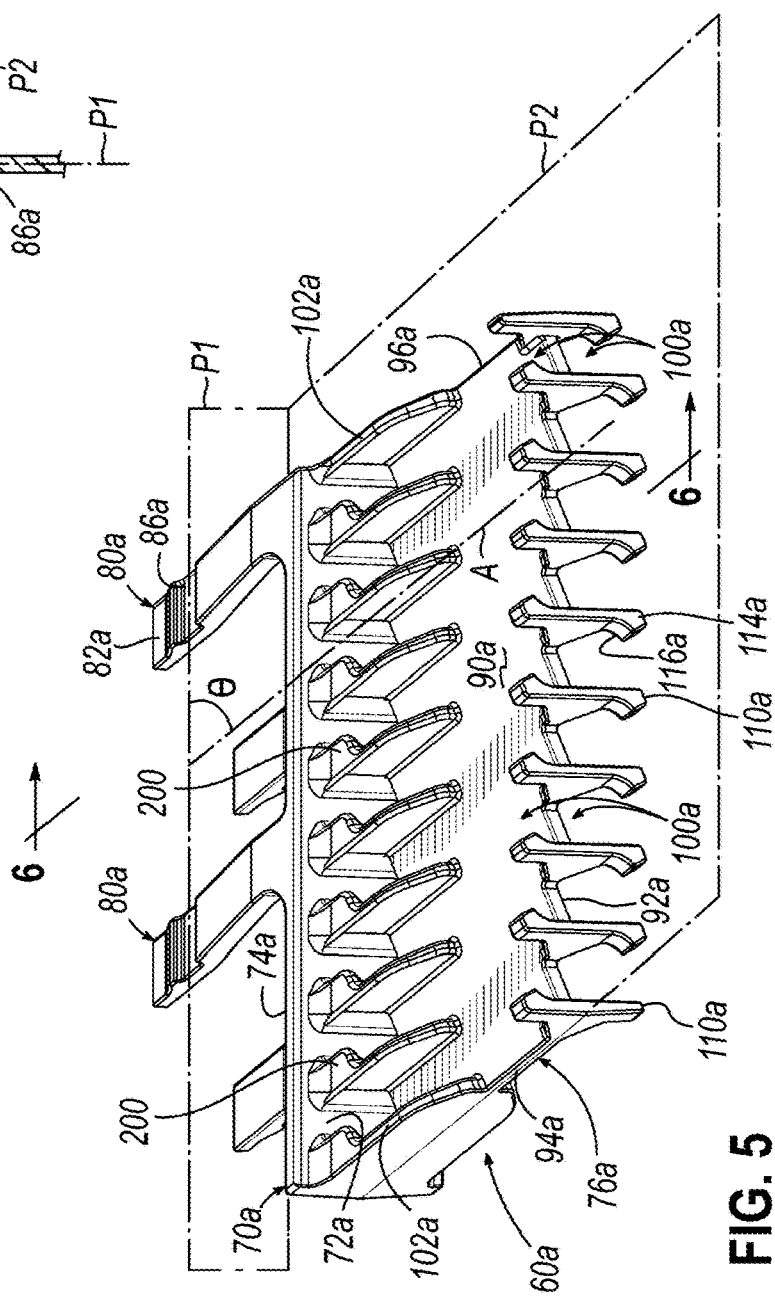
FIG. 5 is a perspective view of another exemplary parking device according to this disclosure.

Referring now to FIGS. 5 and 6, wherein like reference numerals represent like features, an alternative parking device 60a includes a support wall 70a having first and second sides 72a, 74a, a platform 76a extending outwardly from the first side 72a to a distal end 78a, and two mounts in the form of spring clips 80a each including a pair of mounting prongs 82a for mounting the parking device 60a at a desired location on or within the frame 30. In the embodiment shown, the support wall 70a, the platform 76a, and the mounting prongs 82a are integrally formed together as a unitary (i.e., monolithic) piece.

Each of the illustrated prongs 82a includes a locking groove 86a configured to engage with the periphery of an aperture 84 of the mounting structure 64 to assist in securing the parking device 60a in place. Thus, similar to the above embodiment, the locking grooves 86a may together define the mounting plane or first plane P1 of the parking device 60a.

As shown, the platform 76a includes a first surface 90a and a second surface 92a extending between first and second sides 94a, 96a and defines the second plane P2 generally perpendicular to the first plane P1. A plurality of connector slips 100a are positioned on each of the first and second surfaces 90a, 92a of the platform 76a, each of the slips 100a extending along a corresponding axis A generally parallel to the second plane P2 and intersecting the first plane P1 at a generally acute angle θ. The acute angle θ may be, for example, between 20° and 50°. In one embodiment, the acute angle θ is approximately 30°. In another embodiment, the acute angle θ is approximately 40°.

The exemplary parking device 60a includes a plurality of partitions 102a similar to the above embodiment. In the embodiment shown, some or all of the partitions 102a include an overhang 200 at or near the support wall 70a. As shown, each overhang 200 on a particular partition 102a opposes a portion of the first or second surfaces 90a, 92a of the platform 76a in a spaced apart relation. This spacing allows a portion of a connector 50, such as a dust cap 122, to pass therebetween into the corresponding slip 100a. In one embodiment, the overhang 200 may be configured to assist in preventing a portion of the connector 50, such as the dust cap 122, from becoming inadvertently dislodged from the slip 100a.

A plurality of spring arms 110a are positioned at or near the distal end 78a of the platform 76a similar to the above embodiment. Some or all of the spring arms 110a include a tab 114a having a shoulder 116a facing the corresponding slip 100a to assist in retaining the connector 50 in the slip 100a. The fiber optic connector 50 may be supported in the slip 100a primarily or entirely by the connector boot 112 received by the corresponding spring arms 110a. In one embodiment, the connector body 104 may be in direct contact with the corresponding surface 90a, 92a of the platform 76a such that the platform 76a may directly support the connector body 104.

When installed, the second plane P2 may extend in a generally lateral direction (e.g., horizontal), such that each slip 100a is configured to direct a corresponding connector 50 at least slightly laterally as a result of the acute angle θ. In other words, rather than projecting directly away from the slips 100a (e.g., perpendicularly), each connector 50 at least initially projects away from the corresponding slip 100a at the angle θ relative to the first plane P1 and thus at the same angle θ relative to the desired reference plane. This may appreciably reduce the frontal projection of the output cables 48 exiting the parking device 60 since a reduced bend is required for output fibers to transition to a lateral direction toward their respective destinations.

While the present disclosure has been illustrated by the description of specific embodiments thereof, and while the embodiments have been described in considerable detail, it is not intended to restrict or in any way limit the scope of the appended claims to such detail. The various features discussed herein may be used alone or in any combination within and between the various embodiments. Additional advantages and modifications will readily appear to those skilled in the art. The disclosure in its broader aspects is therefore not limited to the specific details, representative apparatus and methods and illustrative examples shown and described. Accordingly, departures may be made from such details without departing from the scope of the disclosure.

What is claimed is:

1. A fiber optic parking device comprising:
   a support wall having front and rear sides;
   at least one mount extending outwardly from the rear side of the support wall and defining a first plane
   a platform extending outwardly from the front side of the support wall and defining a second plane, the platform including a plurality of connector slips, wherein each of the connector slips extends along a corresponding axis parallel to the second plane and intersecting the first plane at an acute angle; and
   a plurality of partitions spaced apart from each other to at least partially define the plurality of connector slips, wherein the plurality of partitions are parallel to the plurality of connector slips.

2. The fiber optic parking device of claim 1, wherein each of the partitions extends in a direction parallel to the axes.

3. The fiber optic parking device of claim 1, wherein each of the partitions extends outwardly from the front side of the support wall.

4. The fiber optic parking device of claim 1, further comprising:
   a plurality of spring arms spaced apart from each other to at least partially define the plurality of connector slips.

5. The fiber optic parking device of claim 4, wherein each of the spring arms is positioned at a distal end of the platform.

6. The fiber optic parking device of claim 4, wherein at least one of the spring arms includes a tab having a shoulder facing a corresponding one of the connector slips.

7. The fiber optic parking device of claim 1, further comprising:
   a plurality of bores provided in the support wall along each of the axes.

8. The fiber optic parking device of claim 7, wherein each of the plurality of bores extends through the support wall.

9. The fiber optic parking device of claim 1, wherein the platform includes a first surface and a second surface, and wherein a first portion of the plurality of connector slips is positioned on the first surface and a second portion of the plurality of connector slips is positioned on the second surface.

10. The fiber optic parking device of claim 1, wherein the at least one mount includes at least one spring clip having a pair of prongs that extend outwardly from the rear side of the support wall, the pair of prongs being configured to engage with a terminal for mounting the support wall to the terminal.

11. The fiber optic parking device of claim 10, wherein each of the prongs includes a locking groove configured to engage with a periphery of a corresponding aperture in the terminal, and wherein the locking grooves define the first plane.

12. The fiber optic parking device of claim 1, wherein the first and second planes are substantially perpendicular to each other.

13. The fiber optic parking device of claim 1, wherein the acute angle is between 20° and 50°.

14. The fiber optic parking device of claim 1, wherein the at least one mount and the platform are integrally formed together as a unitary piece.

15. A fiber optic assembly comprising:
   at least one mounting structure;
   at least one fiber optic parking device mounted to the at least one mounting structure, the at least one fiber optic parking device comprising:
      a support wall having front and rear sides;
      at least one mount extending outwardly from the rear side of the support wall and defining a first plane;
      a platform extending outwardly from the front side of the support wall and defining a second plane, the platform including a plurality of connector slips, wherein each of the connector slips extends along a corresponding axis parallel to the second plane and intersecting the first plane at an acute angle; and
      a plurality of partitions spaced apart from each other to at least partially define the plurality of connector slips, wherein the plurality of partitions are parallel to the plurality of connector slips; and
   at least one fiber optic connector positioned in one of the connector slips.

16. The fiber optic assembly of claim 15, wherein:
   the at least one fiber optic connector comprises a connector body received by a pair of adjacent partitions in the plurality of partitions.

17. The fiber optic assembly of claim 15, wherein:
   the at least one fiber optic parking device further comprises a plurality of spring arms spaced apart from each other to at least partially define the plurality of connector slips;
   at least one of the spring arms includes a tab having a shoulder facing the one of the connector slips in which the at least one fiber optic connector is positioned; and
   the at least one fiber optic connector comprises a connector boot engaged by the tab.

18. The fiber optic assembly of claim 15, wherein:
   the at least one fiber optic parking device further comprises a plurality of spring arms spaced apart from each other to at least partially define the plurality of connector slips; and
   the at least one fiber optic connector comprises a connector boot received by a pair of adjacent spring arms in the plurality of spring arms.

19. The fiber optic assembly of claim 15, wherein:
   the at least one fiber optic parking device further comprises a plurality of bores provided in the support wall along each of the axes; and
   the at least one fiber optic connector comprises a dust cap received in one of the bores.

20. The fiber optic assembly of claim 15, further comprising:
   a door panel, wherein the at least one mounting structure is provided on the door panel.

21. The fiber optic assembly of claim 15, wherein the at least one mounting structure is substantially parallel to the first plane.

22. The fiber optic assembly of claim 15, wherein the first and second planes are substantially perpendicular to each other.

23. The fiber optic assembly of claim 15, wherein the acute angle is between 20° and 50°.

\* \* \* \* \*

UNITED STATES PATENT AND TRADEMARK OFFICE
CERTIFICATE OF CORRECTION

PATENT NO. : 10,955,632 B2  
APPLICATION NO. : 16/658309  
DATED : March 23, 2021  
INVENTOR(S) : William Julius McPhil Giraud Page 1 of 1

It is certified that error appears in the above-identified patent and that said Letters Patent is hereby corrected as shown below:

On the Title Page

In Column 1, item (73), Assignee, Line 1, delete "Coming" and insert -- Corning --, therefor.

Signed and Sealed this  
Eighth Day of June, 2021

Drew Hirshfeld  
*Performing the Functions and Duties of the*  
*Under Secretary of Commerce for Intellectual Property and*  
*Director of the United States Patent and Trademark Office*